(No Model.)
V. D. ANDERSON.
APPARATUS FOR TREATING REFUSE.
No. 430,795.  Patented June 24, 1890.
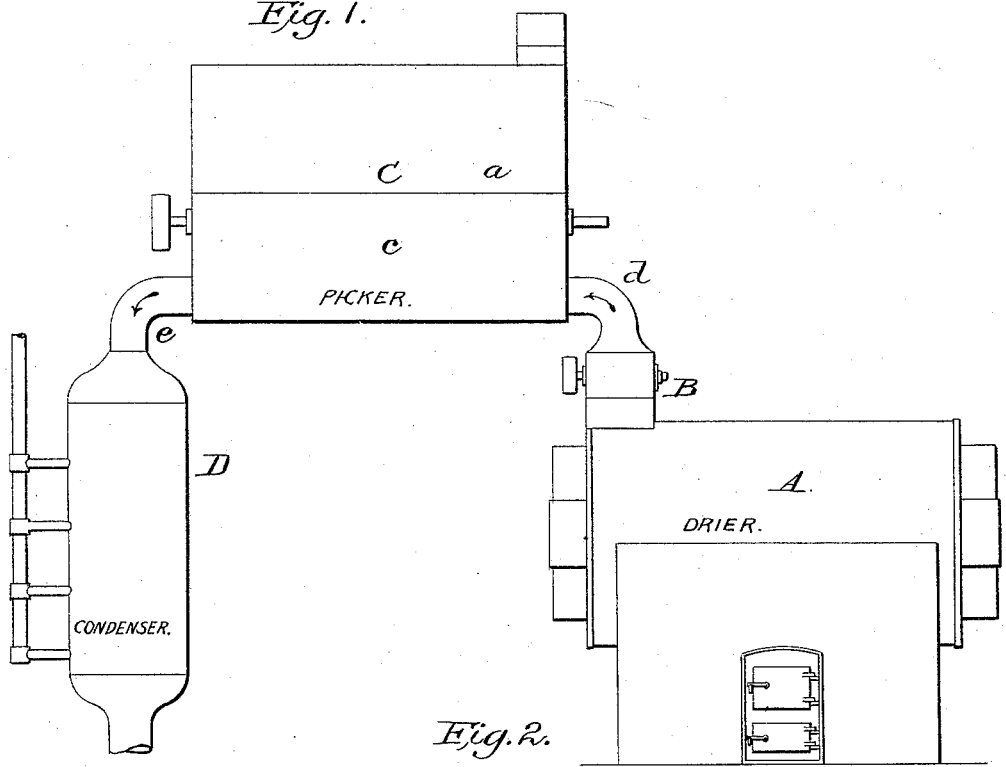
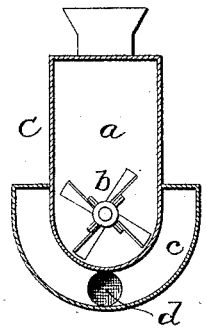
Witnesses:
James F. Duhamel
Horace A. Dodge.
Inventor:
Valerius D. Anderson,
by Dodge Sons,
Attys.

UNITED STATES PATENT OFFICE.

VALERIUS D. ANDERSON, OF CLEVELAND, OHIO.

APPARATUS FOR TREATING REFUSE.

SPECIFICATION forming part of Letters Patent No. 430,795, dated June 24, 1890.

Application filed April 19, 1889. Serial No. 307,710. (No model.)

*To all whom it may concern:*

Be it known that I, VALERIUS D. ANDERSON, a citizen of the United States, residing at Cleveland, in the county of Cuyahoga and State of Ohio, have invented certain new and useful Improvements in Apparatus for Treating Refuse, of which the following is a specification.

My invention relates to an improved arrangement of apparatus for the treatment of the refuse materials from tanneries, slaughter-houses, sugar-refineries, and the like, whereby the disposition and treatment may be economically effected.

In the drawings, Figure 1 is a view illustrating an arrangement of the apparatus for carrying out my invention; Fig. 2, a detail view.

In the treatment of refuse from slaughterhouses, &c., the operation is attended with offensive odors, which have to be disposed of, and to secure this result I have devised and patented (September 7, 1886, No. 348,541) a drier, in which the odors are drawn from the machine by a current of air traveling in the reverse direction from the material. A large quantity of steam is also generated within the drying-tubes, which is drawn off with the noxious odors, the practice heretofore being to convey the steam and odors directly to a condenser—such, for instance, as that shown in Letters Patent No. 355,291, granted to me January 4, 1887—and there subject it to the action of water. The steam is so hot, however, as to require a considerable body of water to effect the condensation, and this becomes a matter of consequence where water is scarce.

In the treatment of the refuse from sugar-refineries it is found that an excess of heat in the apparatus tends to coat the particles of refuse, and as a result the material is discharged from the machine with a hard coating and of a form resembling shot, and is consequently of no commercial value. By my arrangement this difficulty is avoided and the material discharged from the machine in a finely-powdered form. Not only this, but I also lessen the quantity of water required for the condensation of the steam passing from the drier and utilize the waste steam generated in the drier and usually condensed at once for the purpose of treating the refinery refuse.

Referring now again to the drawings, A indicates a drier, which may be varied in construction, as desired, but which will advisably be provided with a fan B, by means of which the steam given off by the material under treatment may be withdrawn.

C indicates what I term the "picker," which comprises a closed chamber $a$, in which is mounted a beater $b$, as shown in Fig. 2. The lower part of the picker is double-walled to make a steam-space $c$, which latter communicates by means of a pipe $d$ with the casing of fan B, so as to receive the steam drawn off from the drier.

D indicates a condenser, which is connected with the steam-space $c$ of the picker by means of a pipe $e$.

Now the steam that is drawn off from the drier passes into the steam-space $c$ of the picker, where it heats the material sufficiently to thoroughly dry it, but not to bake it, and during this drying the beater $b$ is rotated at the rate of about twelve hundred revolutions per minute, thereby loosening the material up and preventing the formation of the material into little balls. The steam passes from the drier at a low temperature, but will be found sufficient to dry the material in the picker when agitated, as described. There will also be a uniformity in the temperature of the steam delivered to the picker, which is a matter of considerable importance. The steam as it passes through the picker will be condensed to a considerable extent, and as a consequence the amount that passes through pipe $e$ to the condenser will be comparatively small. From this arrangement it will be seen that the heating of the picker is effected by steam which would otherwise be wasted, that no extra work is required of the drier, and that the expense of condensing the steam is reduced. Furthermore, I am enabled by this arrangement to successfully treat a substance that has not heretofore been treated in such manner as to make it of any value.

Having thus described my invention, what I claim is—

1. In combination with a drier, a picker provided with a steam-chamber arranged to receive the steam given off by the material under treatment in the drier, and a condenser connected with the steam-space of the picker and constructed to condense the steam escaping therefrom, all substantially as shown.

2. In combination with the drier, a fan for drawing off the steam from said drier, the picker having a steam-space $c$, a pipe $d$, connecting the fan-casing with the steam-space, the steam-condenser, and a pipe $e$, connecting the latter with the steam-space of the picker, substantially as described.

3. In combination with the drier, a fan connected therewith to draw off the steam, the picker provided with a closed chamber $a$, beater $b$, and steam-space $c$, a pipe $d$, connecting the fan-casing with the steam-space $c$, the condenser D, and a pipe $e$, extending from the steam-space of the picker to the condenser, substantially as described.

In witness whereof I hereunto set my hand in the presence of two witnesses.

VALERIUS D. ANDERSON.

Witnesses:
 CAIUS A. CHAPMAN,
 HOMER H. JOHNSON.